3,200,412
POLYMERIC ORGANOBORON COMPOUNDS AND PROCESS OF PREPARING SAME
Robert J. Brotherton, Fullerton, Lowell L. Petterson, Whittier, and Allen L. McCloskey, Orange, Calif., assignors to United States Borax & Chemical Corporation, Los Angeles, Calif., a corporation of Nevada
No Drawing. Filed Mar. 26, 1962, Ser. No. 182,619
3 Claims. (Cl. 260—2)

The present invention relates as indicated to new polymeric organoboron compounds and has further reference to means for preparing these polymeric compounds.

It is, therefore, the principal object of the present invention to provide new thermally stable polymeric organoboron compounds.

It is a further object of this invention to provide means for preparing these new thermally stable polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron polymers having the recurring structural unit

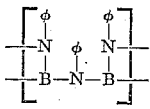

where $\phi$ is phenyl.

The present polymeric organoboron compounds are prepared by the thermal polymerization of tetra(anilino)-diboron. This reaction can best be illustrated by the following equation:

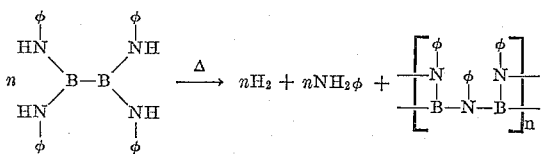

where $\phi$ is phenyl and where $n$ is an integer greater than 1.

The above polymerization reaction is self-initiating and will proceed slowly at a temperature of about 300° C.; however, we have found that this polymerization reaction proceeds to completion at a much more rapid rate when the temperature is increased to about 500° C. Therefore, in the preferred embodiment of the invention we perform the present polymerization reaction at temperatures of from about 300° C. to about 500° C.

The preferred method for performing the present polymerization reaction is to heat tetra(anilino)diboron at temperatures of from about 300° C. to about 500° C. in a closed system which has been evacuated or which contains a positive pressure of an inert gas, such as helium or nitrogen. The volatile reaction products, hydrogen and aniline, are removed during the polymerization process. On cooling, the desired polymeric organoboron compound is recovered from the reaction vessel as the residue.

Tetra(anilino)diboron used as the starting material for the preparation of the present polymeric organoboron compounds is prepared by reacting aniline with a tetra-(dialkylamino)diboron compound in about a 4:1 molar ratio; reference may be had to the Brotherton et al. pending application filed September 13, 1960, bearing Serial No. 55,706, now U.S.P. 3,048,632, and reference to the preparation of the tetra(dialkylamino)diboron compounds can be found in the Brotherton et al. patent, U.S. #2,974,165.

The present polymeric organoboron compounds are thermoplastic resins which melt or soften when heated, and which for the most part are soluble in the common organic solvents. The physical properties of these compounds can be altered by varying the conditions for performing the polymerization reaction. Thus, by varying the pressure at which the reaction is performed, or by heating tetra(anilino)diboron in an inert atmosphere, or by controlling the amount of time the reaction remains at the polymerization temperature, such physical properties as softening point, melting point, color and solubility can be varied.

The polymeric organoboron compounds of the present invention are all thermally stable and resistant to decomposition at temperatures of over 500° C. These compounds find many industrial applications; they find utility as molding and casting resins and as protective coatings for various materials. They have utility as adhesives and as binding agents in the preparation of laminates, and they will be found to have further utility in the preparation of nuclear shielding materials and as high temperature heat transfer media.

So that the present invention can be more clearly understood, the following example is given for illustrative purposes:

I. Tetra(anilino)diboron, 2.82 grams (7.23 mmole), was placed in an evacuated tube which was then sealed. The material was heated for about 48 hours at about 300° C. and a pressure of about 9 atmospheres developed in the tube. The pressure was released and the tube was heated under high vacuum at about 500° C., for 0.75 hour, and then a slow stream of nitrogen was passed over the reaction mass for an additional 0.5 hour at which time hydrogen and aniline evolution had ceased. The reaction tube was allowed to cool and a benzene soluble amber colored resin was recovered. This material softens at 120° C., melts at 160° C., and boils at 500° C. Chemical analysis of the resultant polymeric resin yielded the following data:

Calculated for $C_{18}H_{15}N_3B_2$: B=7.3%; N=14.2%; H=5.1%. Found in product: B=7.9%; N=13.9%; H=5.4%.

The resin had a molecular weight of 885 as determined cryoscopically in benzene.

Other modes of applying the principle of the invention may be employed, change being made as regards the details described, provided the features stated in any of the following claims or the equivalent of such be employed.

We, therefore, particularly point out and distinctly claim as our invention:

1. Thermoplastic organoboron polymers consisting of the recurring structural unit

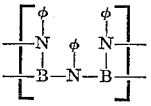

where $\phi$ is phenyl.

2. The method for preparing thermoplastic organoboron polymers consisting of the recurring structural unit

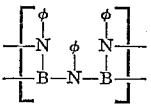

where $\phi$ is phenyl, which comprises heating tetra(anilino)- diboron at temperatures of from about 300° C. to about 500° C. in an evacuated closed system, removing the volatile reaction products from said system, allowing the resultant reaction mass to cool, and recovering said organoboron polymer.

3. The method for preparing thermoplastic organoboron polymers consisting of the recurring structural unit

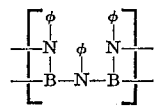

where φ is phenyl, which comprises heating tetra(anilino)- diboron at temperatures of from about 300° C. to about 500° C. in a closed system under a positive pressure of an inert gas, removing said inert gas and the volatile reaction products from said system, allowing the resultant reaction mass to cool, and recovering said organoboron polymer.

References Cited by the Examiner
UNITED STATES PATENTS 3,052,641   9/62   McCloskey _____ 260—2

WILLIAM H. SHORT, *Primary Examiner.*
JOSEPH R. LIBERMAN, *Examiner.*